(12) United States Patent
Constantin et al.

(10) Patent No.: US 11,850,520 B2
(45) Date of Patent: Dec. 26, 2023

(54) COMPUTER SIMULATION SKILLS TRAINING TECHNIQUES

(71) Applicant: Logitech Europe S.A., Lausanne (CH)

(72) Inventors: Christophe Constantin, Cossonay-Ville (CH); Alain Milliet, Pully (CH); Laleh Makarem, Lausanne (CH); Vincent Tucker, Newark, CA (US); Niall White, County Tipperary (IE)

(73) Assignee: Logitech Europe S.A., Lausanne (CH)

( * ) Notice: Subject to any disclaimer, the term of this patent is extended or adjusted under 35 U.S.C. 154(b) by 412 days.

(21) Appl. No.: 17/084,368

(22) Filed: Oct. 29, 2020

(65) Prior Publication Data
US 2022/0134237 A1    May 5, 2022

(51) Int. Cl.
*G06Q 10/0631*    (2023.01)
*A63F 13/795*    (2014.01)
*A63F 13/847*    (2014.01)
*A63F 13/798*    (2014.01)
*G06Q 10/0639*    (2023.01)

(52) U.S. Cl.
CPC .......... *A63F 13/795* (2014.09); *A63F 13/798* (2014.09); *A63F 13/847* (2014.09); *G06Q 10/0639* (2013.01); *G06Q 10/06393* (2013.01); *G06Q 10/063112* (2013.01)

(58) Field of Classification Search
CPC .............................................. G06Q 10/063112
See application file for complete search history.

(56) References Cited

U.S. PATENT DOCUMENTS

2007/0239479 A1 * 10/2007 Arrasvuori ............. G16H 20/30
482/8
2011/0294097 A1 * 12/2011 Montocchio .............. A63F 3/00
463/43

(Continued)

FOREIGN PATENT DOCUMENTS

CA    3133789 A1 *    4/2022
WO    2021092165 A1    5/2021

OTHER PUBLICATIONS

César Daniel Rojas Ferrer et al., "Read-The-Game Skill Evaluation by Analyzing Head Orientation in Immersive VR," 2017, 1Graduate School of Systems and Information Engineering, University of Tsukuba, pp. 1-4 (Year: 2017).*

(Continued)

*Primary Examiner* — Amanda Gurski
(74) *Attorney, Agent, or Firm* — KILPATRICK TOWNSEND & STOCKTON, LLP

(57) ABSTRACT

Techniques are disclosed pertaining to determining a level of proficiency of a user at a computer simulation through the use of a plurality of skill assessment tests. Each skill assessment test can test a respective skill for use in the computer simulation. The techniques can also be used to train a user for the computer simulation and/or to determine team composition using roles for use in the computer simulation. In some aspects, skill assessment tests may incorporate multiple iterations in including a first base line iteration and subsequent iterations that differ between user devices. In some embodiments, metrics that are indicative of a level of proficiency of the user can be made with respect to metrics of other users to determine a user's level of skill with respect to various groups of other users.

20 Claims, 7 Drawing Sheets

(56) References Cited

U.S. PATENT DOCUMENTS

| | | | |
|---|---|---|---|
| 2014/0308645 A1 | 10/2014 | Chaniotakis et al. | |
| 2019/0091581 A1* | 3/2019 | Reiche, III | A63F 13/798 |
| 2019/0091582 A1 | 3/2019 | Reiche et al. | |
| 2020/0111385 A1* | 4/2020 | Issa | G09B 5/02 |
| 2020/0296892 A1 | 9/2020 | Donini et al. | |
| 2021/0097876 A1* | 4/2021 | Rodriguez Bravo | G09B 7/00 |
| 2021/0350719 A1 | 11/2021 | Mathiesen et al. | |
| 2022/0180289 A1* | 6/2022 | Sbodio | G06Q 10/063112 |

OTHER PUBLICATIONS

Juan M. Alberola et al., "Simulating a Collective Intelligence Approach to Student Team Formation," 2013, HAIS, pp. 161-170 (Year: 2013).*

U.S. Appl. No. 17/084,462 , "Non-Final Office Action", dated Jan. 20, 2023, 19 pages.

U.S. Appl. No. 17/084,463 , "Non-Final Office Action", dated Jan. 25, 2023, 20 pages.

Bruwaene , et al., "Assessment of Procedural Skills Using Virtual Simulation Remains a Challenge", Journal of Surgical Education, 2014, pp. 654-661.

Anderson , "Social Skills Training for Children with Autism Utilizing Peers and Behavioral Model", Arizona State University, May 2009, 313 pages.

U.S. Appl. No. 17/084,462 , "Final Office Action", dated Jul. 14, 2023, 21 pages.

Anderson , "Social Skills Training for Children with Autism Utilizing Peers and Behavioral Model", Arizona State University, May 2009, 596 pages.

\* cited by examiner

COMPUTER SIMULATION SKILLS TRAINING TECHNIQUES

BACKGROUND

Computer simulations are widely used for entertainment, education, and training purposes. Many computer simulations are competitive wherein users compete against each other in real time using internetworked computer devices. For example, video games can be competitive computer simulations used for entertainment purposes in the forms of first person shooters, real-time strategy games, driving simulators, role-playing games, etc. In these computer simulations, users may use computer devices in the form of PCs, console game platforms, handheld devices, etc. to interact, via a computer network including the internet, with competing users.

Competitive computer simulations are becoming increasingly popular and support professional competitive tournaments and teams with commensurate monetary prizes. Thus, computer simulations and users' performance at computer simulations are becoming increasingly important to users and spectators alike. However, there are few tools to aid users in becoming more proficient at competitive computer simulations.

BRIEF SUMMARY

In some embodiments, a system for matching users of a computer simulation by role can comprise: a user device including: a user network interface; an input device; a display; and one or more user processors coupled to the user network interface, the input device, and the display, the one or more processors configured to: generate a plurality of skill assessment tests wherein each of the plurality of skill assessment tests is configured to test a respective skill for use in a computer simulation; collect, for each of the plurality of skill assessment tests, metrics for a user while the user interacts with each of the plurality of skill assessment tests via the input device and the display wherein the metrics are indicative of the user's performance at the plurality of skill assessment tests; transmit, via the user network interface, the metrics; a server device including: a server network interface; and one or more server processors coupled to the server network interface, the one or more server processors configured to: receive, via the server network interface, from the user device, the metrics; determine, based on the metrics, and the user's relative proficiency at each of the plurality of skill assessment tests, a suitable role for the user for the computer simulation; receive, via the server network interface, a request from the user device, a request for the user to join a team for an instantiation of the computer simulation wherein the team includes multiple users interacting via the computer simulation; and determine, based on the role of the user, whether the user should join the team. In some aspects, the determining whether the user should join the team is based on one or more rules that define an optimal composition of roles for the team and a comparison of whether the role of the user aligns with other users' roles for the team based on the one or more rules. Determining whether the user should join the team may be based on a preference set by the user defining a role composition for the team. The determining whether the user should join the team can be based on a comparison of a ranking of the user at the computer simulation to corresponding rankings of other potential members of the team.

In certain embodiments, a system for matching users of a computer simulation by role can include: a server device including: a server network interface; and one or more server processors coupled to the server network interface, the one or more server processors configured to: receive, from a user device, via the server network interface, metrics indicative of a user's performance at a plurality of skills of the computer simulation; determine, based on the metrics, a suitable role for the user for the computer simulation; receive a request, from the user device, a request for the user to join a team for an instantiation of the computer simulation wherein the team includes multiple users interacting via the computer simulation; and determine, based on the role of the user, whether the user should join the team. In some aspects, the suitable role is determined based on a comparison of the metrics with corresponding metrics of other users indicative of the other users' performance at the plurality of skills of the computer simulation. The metrics can be determined through a plurality of skill assessment tests performed on a user device or through an analysis of the user operating the computer simulation. In some cases, the role is determined based on a determination, via analysis of the metrics, that the user is proficient at a certain subset of the plurality of skills. In some cases, determining whether the user should join the team is further based on a determination that the user has a relative level of proficiency at the role corresponding to other members of the team's proficiency at their respective roles. In certain embodiments, the relative levels of proficiency of the user at the role are determined by comparing, via the metrics, the user's proficiency at a subset of the plurality of skills versus other users' proficiency at the subset of the plurality of skills. In certain implementations, the determination that the user has the relative level of proficiency at the role corresponding to the other members of the team's proficiency at their respective roles includes: determining that each member of the team has a corresponding rank in their respective role wherein the rank is determined by comparing the each team member's proficiency at the plurality of skills to other users of the computer simulation's proficiency at the plurality of skills.

In further embodiments, a method for matching users of a computer simulation by role comprises: at a server device including a server network interface, receiving, from a user device, via the server network interface, metrics indicative of a user's performance at a plurality of skills of the computer simulation; determining, at the server device, based on the metrics, a suitable role for the user for the computer simulation; receiving, at the server, a request from the user device, a request for the user to join a team for an instantiation of the computer simulation wherein the team includes multiple users interacting via the computer simulation; and determining, at the server, based on the role of the user, whether the user should join the team. The suitable role may be determined based on a comparison of the metrics with corresponding metrics of other users indicative of the other users' performance at the plurality of skills of the computer simulation. In some aspects, the metrics are determined through a plurality of skill assessment tests performed on a user device or an analysis of the user operating the computer simulation. The role can be determined based on a determination, via analysis of the metrics, that the user is proficient at a certain subset of the plurality of skills. The determining whether the user should join the team can be further based on a determination that the user has a relative level of proficiency at the role corresponding to other members of the team's proficiency at their respective roles. In some cases, the relative levels of proficiency of the user at the role can be determined by comparing, via the metrics, the user's proficiency at a subset of the plurality of skills versus other users' proficiency at the subset of the plurality of skills. The determination that the user has the relative level of proficiency at the role corresponding to the other members of the team's proficiency at their respective roles may include: determining that each member of the team has a corresponding rank in their respective role wherein the rank is determined by comparing the each team member's proficiency at the plurality of skills to other users of the computer simulation's proficiency at the plurality of skills.

In some embodiments regarding the use of randomized subsequent skill tests, a system for matching proficiencies in network computer simulation can comprise: a user device including: a user network interface; an input device; a display; and one or more user processors coupled to the user network interface, the input device, and the display, the one or more processors configured to: provide a plurality of skill assessment tests wherein each of the plurality of skill assessment tests is configured to test a respective skill for use in a computer simulation, wherein: a first iteration of a one of the plurality of skill assessment tests is common for the user device and additional user devices; a subsequent iteration of the one of the plurality of skill assessment tests is randomized such that the iteration of the one of the plurality of skill assessment tests is different between the user device and the additional user devices; collect, for each of the plurality of skill assessment tests, metrics for a user while the user interacts with each of the plurality of skill assessment tests via the input device and the display wherein the metrics are indicative of the user's performance at the plurality of skill assessment tests; transmit, via the user network interface, the metrics; a server device including: a server network interface; and one or more server processors coupled to the server network interface, the one or more server processors configured to: receive, from the user device, the metrics; receive, from the additional user devices, additional metrics indicative of additional users' performance at the plurality of skill assessment tests including the first iteration of the one of the plurality of skill assessment tests and the subsequent iteration of the one of the plurality of skill assessment tests; compare the metrics from the user device with the additional metrics from the additional user devices; determine, based on the comparison of the metrics from the user device with the additional metrics from the additional user devices, data indicative of a level of proficiency of the user of the user device at the one of the plurality of skill assessment tests; and transmit, via the server network interface, the data indicative of the level of proficiency of the user to the user device. The metrics can be organized into features, wherein each of the features includes a quantitative value corresponding to one or more of the metrics. In some cases, a subset of the features is used to determine the level of proficiency of the user of the user device at the one of the plurality of skill assessment tests. The subset of features can be determined based on a comparison of the metrics for the user at the one of the plurality of skill assessment tests and corresponding metrics for other users at the one of the plurality of skill assessment tests.

In further embodiments, a method of determining proficiency of a plurality of users at a computer simulation can comprise: providing, to each of the plurality of users via a respective computer device, one of a plurality of skill assessment tests, wherein: each of the plurality of skill assessment tests is configured to test a respective skill for use in the computer simulation; a first iteration of the one of the plurality of skill assessment tests is common for each of the plurality of users; and a subsequent iteration of the one of the plurality of skill assessment tests is randomized such that the subsequent iteration of the one of the plurality of skill assessment tests is different for each of the plurality of users but still tests the proficiency of the plurality of users at a skill corresponding to the one of the plurality of skill assessment tests; collecting, at a server device, metrics indicative of performance of the plurality of users for the first iteration and the subsequent iteration at the one of the plurality of skills; and determining, at the service device, a relative proficiency for each of the plurality of users at the one of the plurality of skill assessment tests. In some aspects, the plurality of skill assessment tests are administered to the user via a user device including an input device and a display device. In certain embodiments, the randomized subsequent iteration of the one of the plurality of skill assessment tests includes a rendered object that is randomized with respect to at least one of a location or a time that the rendered object appears on the display device.

In further embodiments, an amount of randomization applied to the rendered object is selected based on a current level of proficiency of the user at the one of the plurality of skills. In some cases, the metrics include data generated corresponding to a status of the input device as the user operates the input device in response to the randomized rendered object. The metrics can be organized into features, wherein each of the features includes a quantitative value corresponding to one or more of the metrics and quantitative values for the features are used to determine the level of proficiency of the plurality of users at the one of the plurality of skill assessment tests instead of all of the metrics. Each of the plurality of skill assessment tests can be administered to the plurality of users as a corresponding first common baseline test and a corresponding subsequent randomized test. In certain cases, each of the plurality of skill assessment tests is configured to assess a user's proficiency at a task that is performed as part of the computer simulation.

In certain embodiments, a system for determining proficiency of a plurality of users at a computer simulation comprises: a user device including: a user network interface; and one or more user processors coupled to the user network interface, the input device, and the display, the one or more processors configured to: provide a plurality of skill assessment tests wherein each of the plurality of skill assessment tests is configured to test a respective skill for use in the computer simulation, wherein: each of the plurality of skill assessment tests is configured to test a respective skill for use in the computer simulation; a first iteration of the one of the plurality of skill assessment tests is common for each of the plurality of users; and a subsequent iteration of the one of the plurality of skill assessment tests is randomized such that the subsequent iteration of the one of the plurality of skill assessment tests is different for each of the plurality of users but still tests the proficiency of the plurality of users at a skill corresponding to the one of the plurality of skill assessment tests; and a server computer device including one or more processors, the one or more processors configured to: collect metrics indicative of performance of the plurality of users for the first iteration and the subsequent iteration at the one of the plurality of skills; and determine a relative proficiency for each of the plurality of users at the one of the plurality of skill assessment tests. In some implementations, the user device includes an input device and a display device. The randomized subsequent iteration of the one of the plurality of skill assessment tests can include a rendered object that is randomized with respect to at least one of a location or a time that the rendered object appears on the display device. In some aspects, an amount of randomization applied to the rendered object is selected based on a current level of proficiency of the user at the one of the plurality of skills. The metrics can include data generated corresponding to a status of the input device as the user operates the input device in response to the randomized rendered object. The metrics can be organized into features, wherein each of the features includes a quantitative value corresponding to one or more of the metrics and quantitative values for the features are used to determine the level of proficiency of the plurality of users at the one of the plurality of skill assessment tests instead of all of the metrics. Each of the plurality of skill assessment tests may be administered to the plurality of users as a corresponding first common baseline test and a corresponding subsequent randomized test. In some cases, each of the plurality of skill assessment tests is configured to assess a user's proficiency at a task that is performed as part of the computer simulation.

In some embodiments, a system for skills-based simulation game training can comprise: a user device including: a user network interface; an input device; a display; and one or more user processors coupled to the user network interface, the input device, and the display, the one or more processors configured to: generate a plurality of skill assessment tests wherein each of the plurality of skill assessment tests is configured to test a respective skill for use in a computer simulation; collect, for each of the plurality of skill assessment tests, metrics for a user while the user interacts with each of the plurality of skill assessment tests via the input device and the display wherein the metrics are indicative of the user's performance at the plurality of skill assessment tests; transmit, via the user network interface, the metrics; a server device including: a server network interface; and one or more server processors coupled to the server network interface, the one or more server processors configured to: receive, via the server network interface, from the user device, the metrics; receive, via the server network interface, from additional user devices, additional metrics indicative of additional users' performance at the plurality of skill assessment tests; compare the metrics from the user device with the additional metrics from the additional user devices; determine, based on the comparison of the metrics from the user device with the additional metrics from the additional user devices, data indicative of a level of proficiency of the user of the user device at the computer simulation; and transmit, via the server network interface, the data indicative of the level of proficiency of the user to the user device. Each of the plurality of skill assessment tests may be configured to assess a user's proficiency at a task that is performed as part of the computer simulation.

In some embodiments, a method for determining a proficiency of a user at a computer simulation comprises: providing, to the user, via a user computer device including an input interface and a display, a plurality of skill assessment tests wherein each of the plurality of skill assessment tests is configured to test a respective skill for use in the computer simulation; receiving, at a server computer device, from the user computer device, metrics indicative of the user's performance at the plurality of skill assessment test; collecting, at the server computer, additional metrics indicative of additional users' performance at the plurality of skill assessment tests wherein each of the additional users perform the plurality of skill assessment tests at a computer device; and determining, based on a comparison of the metrics indicative of the user's performance to the additional users' metrics, a level of proficiency of the user at the computer simulation. In some aspects, the user computer device and the server computer are a same device.

In certain embodiments, the computer simulation and the plurality of skill assessment tests use a same engine to generate content of the computer simulation and the plurality of skill assessment tests. The computer simulation can be a network-enabled computer simulation wherein multiple users compete against each other in real time. The determining the level of proficiency of the user at the computer simulation may include comparing a ranking of the user at the computer simulation to ranking of other users of the computer simulation, wherein the rankings are determined through metrics other than metrics indicative of users' performance at the plurality of skill assessment tests. The method can further include collecting individual results for the user at each of the plurality of skill assessment tests and determining, based on the results of the user at the each of the plurality of skill assessment tests, a role suited to the user for the computer simulation. In some aspects, the method further includes displaying, to other users of the computer simulation, the role of the user or a representation of the user's individual results at the each of the plurality of skill assessment tests. In some aspects, the method for determining a proficiency of a user at a computer simulation can further include displaying, to the user, a representation of the user's level of proficiency at the computer simulation based on the comparison of the metrics indicative of the user's performance to the additional users' metrics.

In certain embodiments, a system for determining a proficiency of a user at a computer simulation includes: a user computer device including an input interface, a display, and one or more user processors, the one or more user processors configured to: provide, to the user, a plurality of skill assessment tests wherein each of the plurality of skill assessment tests is configured to test a respective skill for use in the computer simulation; and a server computer device including one or more server processors, the one or more server processors configured to: receive, from the user computer device, metrics indicative of the user's performance at the plurality of skill assessment test; collect additional metrics indicative of additional users' performance at the plurality of skill assessment tests wherein each of the additional users perform the plurality of skill assessment tests at a computer device; and determine, based on a comparison of the metrics indicative of the user's performance to the additional users' metrics, a level of proficiency of the user at the computer simulation. The user computer device and the server computer can be a same device. In some aspects, the computer simulation and the plurality of skill assessment tests can use a same engine to generate content of the computer simulation and the plurality of skill assessment test. The computer simulation can be a network-enabled computer simulation wherein multiple users compete against each other in real time. The determining the level of proficiency of the user at the computer simulation can include comparing a ranking of the user at the computer simulation to ranking of other users of the computer simulation, wherein the rankings are determined through metrics other than metrics indicative of users' performance at the plurality of skill assessment tests. The one or more server processors or the one or more user processors can be configured to: collect individual results for the user at each of the plurality of skill assessment tests and determine, based on the results of the user at the each of the plurality of skill assessment tests, a role suited to the user for the computer simulation. The one or more server processors or the one or more user processors can be configured to display, to other users of the computer simulation, the role of the user, or a representation of the user's individual results at the each of the plurality of skill assessment tests. In some aspects, the one or more server processors are configured to display, to the user, a representation of the user's level of proficiency at the computer simulation based on the comparison of the metrics indicative of the user's performance to the additional users' metrics.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
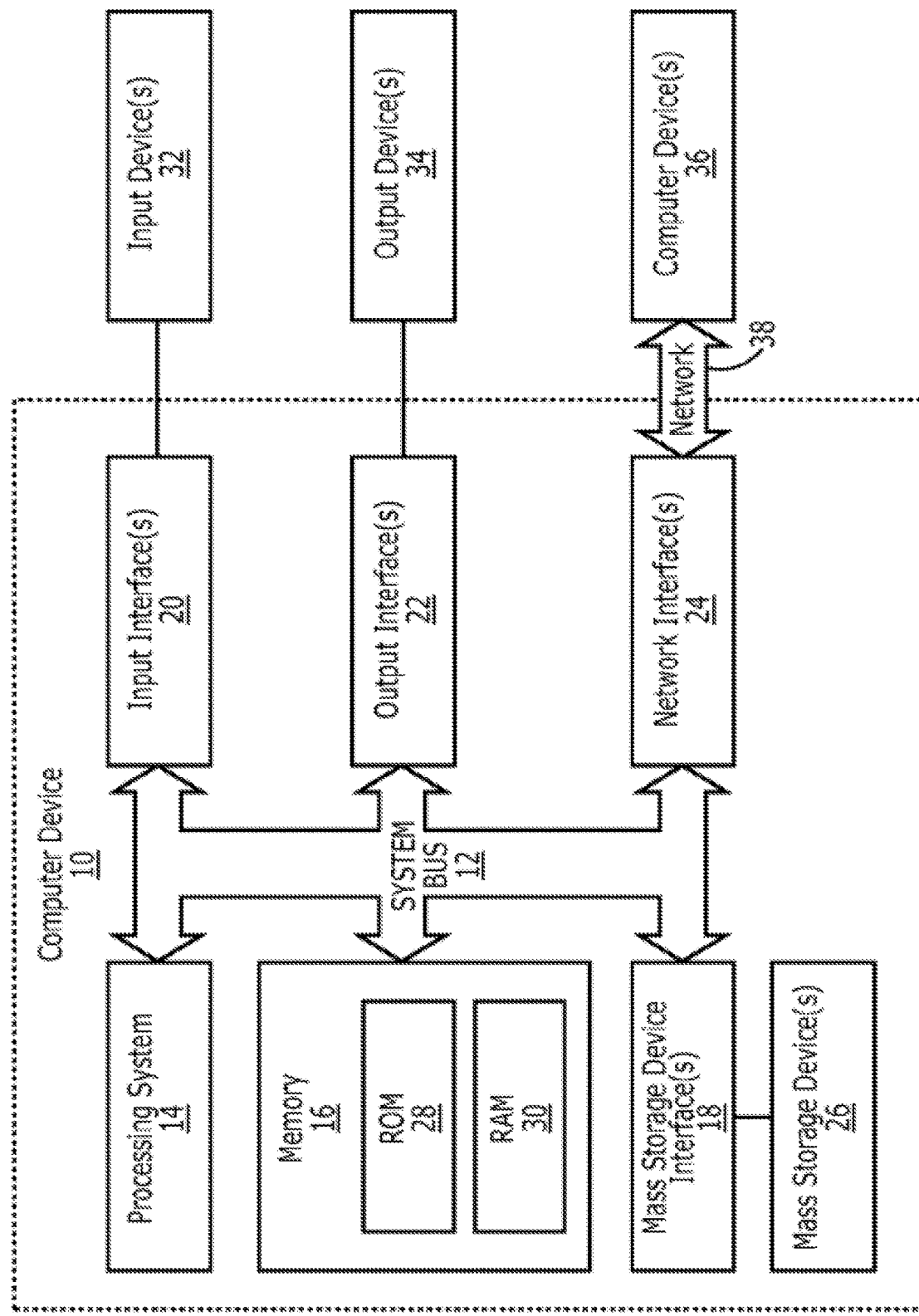
FIG. 1 shows a simplified block diagram of a computer device for use with aspects of the disclosure.

To provide a high level, broad understanding of some aspects of the present disclosure, a non-limiting summary of certain embodiments is presented here. Techniques are disclosed that relate to automated systems for assessing and training skills of users for use in competitive computer simulations. The techniques generally pertain to generating multiple skills assessment tests and administering them to the users. The skill assessment tests can each test a respective skill for use in the computer simulation. By assessing the user's proficiency at each of these tests, a user's overall proficiency at the computer simulation can be assessed. Furthermore, a user's relatively strong and weak skills can be identified. Weak skills can be improved upon via providing the user with training customized for that user. Additionally, by assessing a user's relative strengths and weaknesses, a role for the computer simulation can be determined that the user may be proficient at.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

Competitive computer simulations that allow users to compete against each other by interacting with corresponding user computer devices are becoming increasingly popular with users and spectators alike. Many users enjoy interacting with such simulations from the privacy of their homes, via mobile devices, at tournament settings, etc. As users become more connected through the proliferation of network-enabled devices and the availability of high-speed internet access, these types of simulations have seen a marked growth in popularity.

The popularity has driven interest to a point wherein some users make a career of competing in these simulations through organized tournaments and similar venues. Thus, these entertainment simulations have become increasingly competitive and users are becoming increasingly conscious of and concerned with their performance at such simulations. The disclosed techniques can enable users to increase their level of proficiency at computer simulations by improving skills needed to compete in the simulations. The techniques can include separating many complex skills needed to engage in computer simulations into more individualized and assessable basic skills that are easier to assess and can be more efficiently improved upon.

Assessing a user's proficiency at the individual skills can be used to assess a user's general proficiency at the computer simulation as well as their relative strengths and weaknesses as compared to other users of the simulation. This can be accomplished by comparing the results of an individual user's performance at an individual skill assessment test to other users' results. Furthermore, the relative contribution of individual skills or combinations of skills can be assessed to determine which of the skills indicate, via a causal relationship, a relatively proficient user of the computer simulation.

An assessment of the relative performance of the user's skills can also be used in a team setting wherein a user's proficiency at certain skills can be combined with the complementary proficiencies of another user. Disclosed techniques can be used to identify which skill combinations in a team indicate a proficient team and match users to form a proficient team based on the members' respective proficiencies at the skills. The skill composition can be based on many factors, such as the relative strengths of the opposing team, a current map used for the simulation, past performance of combinations of players, etc.

The use of the individual assessment tests can take several forms. For example, for a first-person shooter, skills tests may include platform jumping, grenade throwing, tracking a moving target, head-shot accuracy, etc. The disclosed techniques include features that prevent users from artificially inflating their scores through memorization or similar techniques. The skill assessment tests can include relatively simplified tasks as compared to the simulation as a whole. The skill assessment tests can include the generation of multiple targets, platforms, etc. To prevent a user from memorizing the locations and/or pathing of these generated features, the techniques can include randomizing aspects of the skill assessment tests. The amount and types of randomization can be selected to avoid the results of each test from being inconsequential. In other words, if the tests are overly randomized, the results cannot be compared with previous user results and/or other users' results. Thus, a balance can be maintained to sufficiently randomize the tests to avoid user memorization but still provide statistically significant results for the tests.

Additional features of the disclosure pertain to improving a user's proficiency at the computer simulation over time. This can be accomplished by assessing a user's current proficiency at the simulation (or at a role for the simulation) through the individual skills assessment tests. An improvement plan can be generated for a user wherein incrementally more difficult challenges can be provided to a user to allow a user to increase their skill proficiencies commensurate with the increased difficulties. The increased difficulties can include altering a speed that a generated target moves at, changing a target's pathing routines, decreasing the size of a target, etc. In certain embodiments, the difficulty levels can be bounded into brackets (e.g., beginner, intermediate, advanced, etc.) to enable test results for a user in a bracket to be compared to other users within the bracket while also enabling the user to advance in proficiency. In some aspects, challenges can be presented as challenges with three levels of difficulty, or as a continuum of difficulty levels for each user with an AI coach where models provide features (e.g., weak, moderate, strong) and custom difficulty levels to best accommodate a particular user's needs for specific and overall improvements in performance.

In some embodiments, score-based kills assessment tests can be aggregated in any suitable manner and may include all or some gameplay actions during all or some time during the skills assessment tests. In such cases, machine learning subroutines, game expertise, and differences between a corresponding amateur and professional users can be used to generate features and their relative weights. The computed weights can be used to generate a score for each skill that can include a local score, global score, or any suitable population of users.

More specifically, systems that operate the computer simulation can use a scoring system to reflect the performance of the user at each skill. A combination of multiple metrics can be used to produce a score assigned to each skill. These metrics may be identified as the representatives of the user performance, as they can be used to distinguish the amateur level community of the users from the professional players. The importance of each metric in the score can then be determined, for example, by maximizing the standard deviation of the scores distribution of all the users. A global score can represent the overall performance of the user and may be calculated by multiplying the individual skill scores.

Definitions

The present disclosure may be better understood in view of the following explanations:

As used herein, the term "computer simulation" refers to a visual, immersive computer-simulated environment provided to a user. A presence of a user in this environment may be simulated by enabling the user to interact with the setting and objects depicted therein. The user's representation in the environment can be known as an avatar. Examples of computer simulations may include: a video game; a medical procedure simulation program including a surgical or physiotherapy procedure; an interactive digital mock-up of a designed feature, including a computer aided design; an educational simulation program, including an e-learning simulation; or other like simulation. The simulated environment may be two- or three-dimensional. Computer simulations may or may not be competitive wherein users of the computer simulation compete with one another in real time via a scoring or objective system. A networked computer infrastructure can enable users to access the computer simulation in real time while being geographically dispersed.

As used herein, the term "display device" means an electronic device that generates optical light that can be viewed by a user. Display devices can be used by a user of the computer simulation to interact with the simulated environment. The devices may also be used to view information indicative of a user's performance at the computer simulation. Examples of display devices include computer monitors, televisions, smartphone screens, tablet computer screen, augmented or virtual reality headsets, etc.

As used herein, the term "rendered images" or "graphical images" may include images that may be generated by a computer and displayed, via a display device, to a user as part of computer simulation. Examples of rendered images can include a user avatar (or an opponent's avatar), a weapon, a crate, a vehicle, etc. A rendered image can include or may be user-readable text. The images may be displayed in two or three dimensions.

As used herein, the term "head mounted display" or "HMD" may refer to a display to render images to a user. The HMD may include a graphical display that is supported in front of part or all of a field of view of a user. The display can include transparent, semi-transparent or non-transparent displays. The HMD may be part of a headset. The graphical display of the HMD may be controlled by a display driver, which may include circuitry as defined herein.

As used herein, the term "skill" means an ability to perform an action with determined results within a given amount of time, energy, or both. The actions, as differentiated from more general testing to determine a user's general abilities, are specific actions performed by a user of a computer simulation. Skills, as used herein, require physical inputs from a user, generally via a user interface device and thus can include, for example, cognitive skills, perceptual skills, affective skills, and so-called muscle memory. The skills are generally therefore not only a user's ability to mentally assess a situation, but an ability to assess and react within bounds of the computer simulation. Skills can be differentiated between complex skills and basic skills. Complex skills can include a plurality of basic skills.

As used herein, the term "metric" means a value of data that is recorded or derived from data recorded by a user when interacting with a computer simulation or a skill assessment test. Metrics can include raw data (e.g., unprocessed data that is collected when a user is interacting) or features which are processed data values based on values of the raw data.

As used herein, the term "software engine" means a set of computer instructions or tools used to generate a computer simulation. A software engine can include a rendering engine for rendering graphics in a certain way. A software engine may also include an input engine, a physics engine, etc. Two computer simulations or similar software constructs generated using the same software engine may have similar appearances, responses to user inputs, etc.

As used herein, the term "electrical circuitry" or "circuitry" may refer to, be part of, or include one or more of the following or other suitable hardware or software components: a processor (shared, dedicated, or group), a memory (shared, dedicated, or group), a combinational logic circuit, a passive electrical component, or an interface. In certain embodiments, the circuitry may include one or more virtual machines that can provide the described functionality. In certain embodiments, the circuitry may include passive components, e.g., combinations of transistors, transformers, resistors, or capacitors that may provide the described functionality. In certain embodiments, the circuitry may be implemented using, or functions associated with the circuitry may be implemented using, one or more software or firmware modules. In some embodiments, circuitry may include logic, at least partially operable in hardware. The electrical circuitry may be centralized or distributed, including being distributed on various devices that form part of or are in communication with the system and may include: a networked-based computer, including a remote server; a cloud-based computer, including a server system; or a peripheral device.

As used herein, the term "processor(s)" or "host/local processor(s)" or "processing resource(s)" may refer to one or more units for processing including an application-specific integrated circuit (ASIC), central processing unit (CPU), graphics processing unit (GPU), programmable logic device (PLD), microcontroller, field programmable gate array (FPGA), microprocessor, digital signal processor (DSP), or other suitable component. A processor can be configured using machine readable instructions stored on a memory. The processor may be centralized or distributed, including distributed on various devices that form part of or are in communication with the system and may include: a networked-based computer, including a remote server; a cloud-based computer, including a server system; or a peripheral device. The processor may be arranged in one or more of: a peripheral device (e.g., a stylus device), which may include a user interface device and/or an HMD; a computer (e.g., a personal computer or like device); or other device in communication with a computer system.

As used herein, the term "computer readable medium/media" includes conventional non-transient memory, for example, random access memory (RAM), an optical media, a hard drive, a flash drive, a memory card, a floppy disk, an optical drive, and/or combinations thereof. It is to be understood that while one or more memories may be located in the same physical location as the system, the one or more memories may be located remotely from the host system, and may communicate with the one or more processors via a computer network. Additionally, when more than one memory is used, a first memory may be located in the same physical location as the host system and additional memories may be located in a remote physical location from the host system. The physical location(s) of the one or more memories may be varied. Additionally, one or more memories may be implemented as a "cloud memory" (i.e., one or more memories may be partially or completely based on or accessed using the network).

As used herein, the term "communication resources" refers to hardware and/or firmware for electronic information transfer. Wireless communication resources may include hardware to transmit and receive signals by radio, and may include various protocol implementations, e.g., 802.11 standards described in the Institute of Electronics Engineers (IEEE), Bluetooth™, ZigBee, Z-Wave, Infra-Red (IR), RF, or the like. Wired communication resources may include a modulated signal passed through a signal line; said modulation may accord to a serial protocol such as, for example, a Universal Serial Bus (USB) protocol, serial peripheral interface (SPI), inter-integrated circuit (I2C), RS-232, RS-485, or other protocol implementations.

As used herein, the term "network" or "computer network" means a plurality of distinct computer devices that communicate with one another electronically. Networks may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, another type of suitable network, and/or combinations thereof.

As used herein, the term "sensor system" refers to a system operable to provide position information concerning interface devices, peripherals, and other objects in a physical world that may include a body part or other object. The term "tracking system" may refer to detecting movement of such objects. The body part may include an arm, leg, torso, or subset thereof including a hand or digit (finger or thumb). The body part may include the head of a user. The sensor system may provide position information from which a direction of gaze and/or field of view of a user can be determined. The object may include a peripheral device interacting with the system. The sensor system may provide a real-time stream of position information. In an embodiment, an image stream can be provided, which may represent an avatar of a user. The sensor system and/or tracking system may include one or more of a: camera system; a magnetic field-based system; capacitive sensors; radar; acoustically-based tracking systems; other suitable sensor configuration; optical, radio, magnetic, and inertial technologies, such as lighthouses, ultrasonic, IR/LEDs, SLAM tracking; light detection and ranging (LIDAR) tracking; ultra-wideband tracking; and other suitable technologies as understood to one skilled in the art. The sensor system may be arranged on one or more of: a peripheral device, which may include a user interface device, the HMD; a computer (e.g., a P.C., system controller or like device); or other device in communication with the system.

As used herein, the term "user interface device" includes various devices to interface a user with a computer, examples of which include: pointing devices including those based on motion of a physical device, such as a mouse, trackball, joystick, keyboard, gamepad, steering wheel, paddle, yoke (control column for an aircraft), a directional pad, throttle quadrant, pedals, light gun, or button; pointing devices based on touching or being in proximity to a surface, such as a stylus, touchpad or touch screen; a 3D motion controller, or other suitable user interface device, as would be appreciated by one of ordinary skill in the art with the benefit of this disclosure. The user interface device may include one or more input elements. In certain embodiments, the user interface device may include devices intended to be worn by the user. Worn may refer to the user interface device supported by the user by means other than grasping of the hands. In many of the embodiments described herein, the user interface device is a stylus-type device for use in an AR/VR environment.

As used herein, the term "keyboard" refers to an alphanumeric keyboard, emoji keyboard, graphics menu, or any other collection of characters, symbols or graphic elements. A keyboard can be a real world mechanical keyboard, or a touchpad keyboard such as a smart phone or tablet On Screen Keyboard (OSK). Alternatively, the keyboard can be a virtual keyboard displayed in an AR/MR/VR environment.

Operating Environment—Computer Device

FIG. 1 and the corresponding discussion are intended to provide a general description of a suitable operating environment in which the aspects of the disclosure may be implemented. One skilled in the art will appreciate that the disclosure may be practiced by one or more computing devices and in a variety of system configurations, including a networked configuration.

Certain embodiments of the present invention may embrace one or more computer readable media, wherein each medium may be configured to include or includes thereon data or computer executable instructions for manipulating data. The computer executable instructions can include data structures, objects, programs, routines, or other program modules that may be accessed by a processing system, such as one associated with a general-purpose computer capable of performing various different functions or one associated with a special-purpose computer capable of performing a limited number of functions. Computer executable instructions can configure a processing system to perform a particular function or group of functions. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA"), a smart phone, or other hand-held device, a workstation, a minicomputer, a mainframe, a supercomputer, a multi-processor system, a network computer, a processor-based consumer electronic device, an HMD, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, or an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device.

Furthermore, in a networked system computer device 10 may participate in a distributed computing environment, where functions or tasks are performed by a plurality of networked computer devices.

Operating Environment—Computer Network

Figure 2:
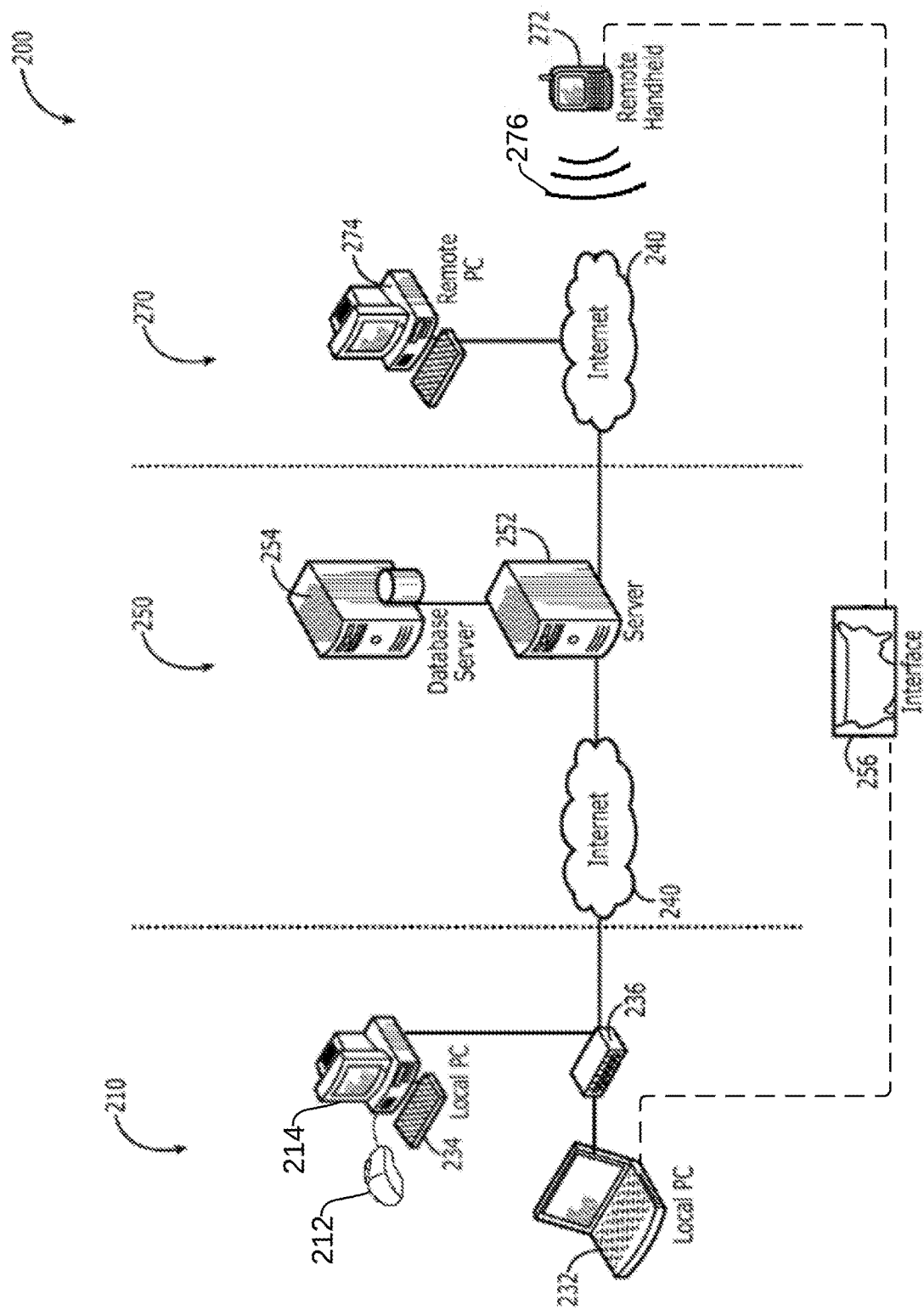
FIG. 2 shows a simplified diagram of internetworked computer devices, such as those shown in FIG. 1, according to certain embodiments.

Reference is next made to FIG. 2, which illustrates a network schematic view of a distributed computer architecture suitable for effectuating certain embodiments of the present invention, designated generally as 200. Various components of the illustrated system will be further described for purposes of reference to aspects of the present invention. It will be appreciated that embodiments of the present invention may be utilized with other computer network architectures such as peer-to-peer based systems. The illustrated system 200 includes a local computer user interface system 210, a server computer system 250, and a remote client system 270. The systems 210, 250, 270 can be coupled via the internet 240 acting as a data transmission system. They may also be coupled via a local network, WAN, LAN, or other network arrangement. Various components may be further distributed or geographically consolidated for purposes of utilizing hardware and/or data coupling resources.

The local computer user interface system 210 can include a video router (not shown), a control module (not shown), a local laptop client 232, a local PC client 234, a user interface device 212, a display device 214, and a local network router 236. A user may interact with local PC client 234 via user interface device 212 to interact with a computer simulation displayed on display device 214. A user may also interact with other user computer devices, such as local laptop client 232, smartphone, gaming console, tablet computer, or the like. The user computer device may include client software included therein to support the user's interactions with the computer simulation (e.g., via a locally running instance of a software engine) and/or to implement aspects of the disclosure. For example, a user computer device may be used to generate or otherwise provide skills assessment tests to the user. A user computer device may collect various pieces of data pertaining to a user's performance at the skills assessment tests and communicate said data to server computer system 250. The data may include "raw" data which includes values of data recorded directly from a user's interaction with a user computer device. The raw data may be further processed into "features." The features may be combinations or transformations of raw data into a form that can be used to assess a user's proficiency at the skill assessment test and/or computer simulation in general. Raw data and/or features may be transmitted to a server computer as will be further disclosed herein.

User interface device 212 (which may be a keyboard, mouse, gamepad, touchscreen, etc.) may be used to enable a user to interact with the user computer device. As will be disclosed herein, local network router 236 can be used to enable a user interface device to interact with other user computer devices via the internet 240, for example. It should be understood that local network router 236 is a non-limiting example of a network device that enables a user computer device to communicate with other user computer devices. Other examples can include cellular towers, access points, wired or wireless routers, hubs, or switches, etc.

User interface system 210 can be coupled server computer system 250 via internet 240. Server computer system 250 can include database server 254, and a server 252. Database server 254 may be configured to store data sets from one or more user computer devices, such as local PC client 234, such as associated raw data values, features data values, authentication information, user account information, etc. Server 252 can be configured to analyze, according to one or more rules, data stored on database server 254. Through the analysis of the data sets of multiple users performing corresponding skills assessment tests for a computer simulation, server 252 may quantitatively determine an individual user's relative level of proficiency at a computer simulation and/or at one or more individual skills for the computer simulation.

Server 252, or a like device, may be configured to facilitate a computer simulation in conjunction with user computer devices. For example, each user computer device may run client software wherein images are rendered and displayed to a user, via a display device, and input received from the user via a user interface device. The client software may interact with server-side software that collects certain data to enable multiple instances of client software to interact to form a multi-user-enabled computer simulation. In this simulation, users may compete against one another to perform certain goals. For example, the computer simulation may be a video game, such as a first-person shooter, strategy game, racing simulation, etc., wherein users compete on score, times, achieving objectives, etc. It should be understood that client software may not be required for implementing features of the disclosure if, for example, the simulation is processed substantially on one or more server computer devices that may stream data to user devices. It should also be understood that the disclosed features that enable the multi-user computer simulation and skills test generation and assessment may be performed on any number of user devices or server devices in any combination.

Interface 256 is provided as a visual representation of an interface that may be accessible to a user to access and assess certain functionalities of the disclosure pertaining to skill assessment. Interface 256 may be a graphical user interface or other that may be run on a server computer or user device. Through interface 256, a user may be able to:

1. Assess his/her proficiency at one or more computer simulations;
2. Determine his/her proficiency at one or more skills pertaining to one or more computer simulations;
3. Ingest a generated proficiency improvement plan for one or more skills;
4. Determine a suitability for a role at a certain computer simulation;
5. Assess or ingest suitable teammates that complement a user's skill set for a computer simulation; or
6. Set preferences related to any of the preceding (e.g., a desired team composition).

In certain embodiments, a user's proficiency at a computer simulation can be determined based on an evaluation of the user's performance at a plurality of skill assessment tests. A user may use user interface 256 to assess his/her individual proficiency which may be represented numerically as a ranking or score and/or qualitatively as beginner, intermediate, and expert, for example. Techniques for determining the proficiency of a user will be disclosed in greater detail herein. In some aspects, the UI (e.g., dashboard) may provide for a user to compare themselves with members of the gaming community, professionals, or to share their own results on social media platforms.

Interface 256 may be used to determine a user's proficiency at one or more skills. The skills may include, for example, accurate strafing, grenade throwing, strafing, head shot or target proficiency, gear shifting timing, tight turns or racing line proficiency, drafting, drifting, build order, object placement, etc. The relative level of proficiency of the user at these skills may be presented quantitatively or qualitatively and may be presented as a spider or radar plot, a bar chart, or other suitable representation. These skill proficiencies may be used to determine a suitable role for a user at a computer simulation. For example, if a user is relatively good at headshots but relatively bad at strafing and jumping, this may indicate that a user may be better suited for a sniper role at a first-person shooter than a melee role. Role suggestions and/or suitability scores may be presented to a user.

Interface 256 may be used to access a skill improvement plan for a user. For example, a relative proficiency of a user may be determined for one or more skills using skill assessment tests. The skill assessment tests may be provided to a user iteratively over time so that a user may gain proficiency at a skill that the corresponding tests assess. A user may provide certain criteria for a skill improvement plan, such as an amount of time, a period between tests, lengths of tests, a goal level of proficiency, etc., and/or a computer device may automatically generate a suggested skill improvement plan. This plan may be displayed to a user via interface 256 and may include an indication of notional improvement to the skill if the user performs the skill assessment tests. For example, a graph can be shown illustrating improvement to one or more skills of a user if the iterative skills assessment tests are performed. Results of the iterative skill assessment tests can be collected and compared to the expected improvements of the user to track progress. The skill assessment tests may also be modified over time (e.g., a level of difficulty increased) to be commensurate with the proficiency of the user. For example, a user's proficiency may outgrow a relatively easy test and thus the test may be modified over time to make the test more difficult and challenge the user to increase the user's proficiency at the skill(s) needed for the test.

Interface 256 may be used to aid in role-based team formation. For example, a suitable role for a user may be assessed through the use of the skill assessment tests as disclosed herein. An optimal team composition for a certain computer simulation (and/or for a certain iteration of a computer simulation) may be determined as disclosed herein and/or selected via user preferences. For example, a first-person shooter simulation may operate by having two opposing five-member teams face off against each other. An optimal team composition may be determined to include two strafers, a camper, a sniper, and a medic, or instance. A user may compare their suitability for a role (camper, for example), and match this suitability with other users who have complementary role suitability. These users may be matched, as a team, for a computer simulation iteration or suitable users may be presented with identifications of users with complementary roles so that the user may add them to a "friends" list or similar grouping and form teams as desired.

The team composition may also be influenced by respective overall proficiencies of users at the computer simulation. For example, an extremely proficient user may be prevented from being matched with a novice user to avoid an unbalanced or unpleasant computer simulation experience. Another example is that a relatively more experienced user may be matched with a less experienced user to enable the less experienced user to enhance their skills or learn a new skill set. These options may be changed based on user preferences.

Remote client system 270 can include a remote client PC 274 and a remote client handheld 272, both communicatively coupled to internet 240. Remote clients 272, 274 are examples of users/clients configured to display interface 256 to facilitate interaction with aspects of the skills assessment techniques disclosed herein. Various other types of remote client devices may also act as users/clients, including but not limited, to computers, phones, cameras, and other electronic devices coupled to internet 240 via any type of data connection. Wireless interface 276 is included as an example of a non-wired interface to allow a computer device to access internet 240 (or similar networks) to enable features of the disclosure. Remote clients 272, 274 may also interface with the server 252 or additional modules for purposes of authentication, data routing, electronic payment, management, etc. Remote clients 272, 274 may be coupled to internet 240 utilizing various well known connection schemes including, but not limited to, cellular phone data networks, local computing data networks, etc. Remote clients 272, 274 may interact with and/or receive the interface 256 through an internet web browser or directly through a particular local software module configured to access interface 256.

Skill Decomposition

Figure 3:
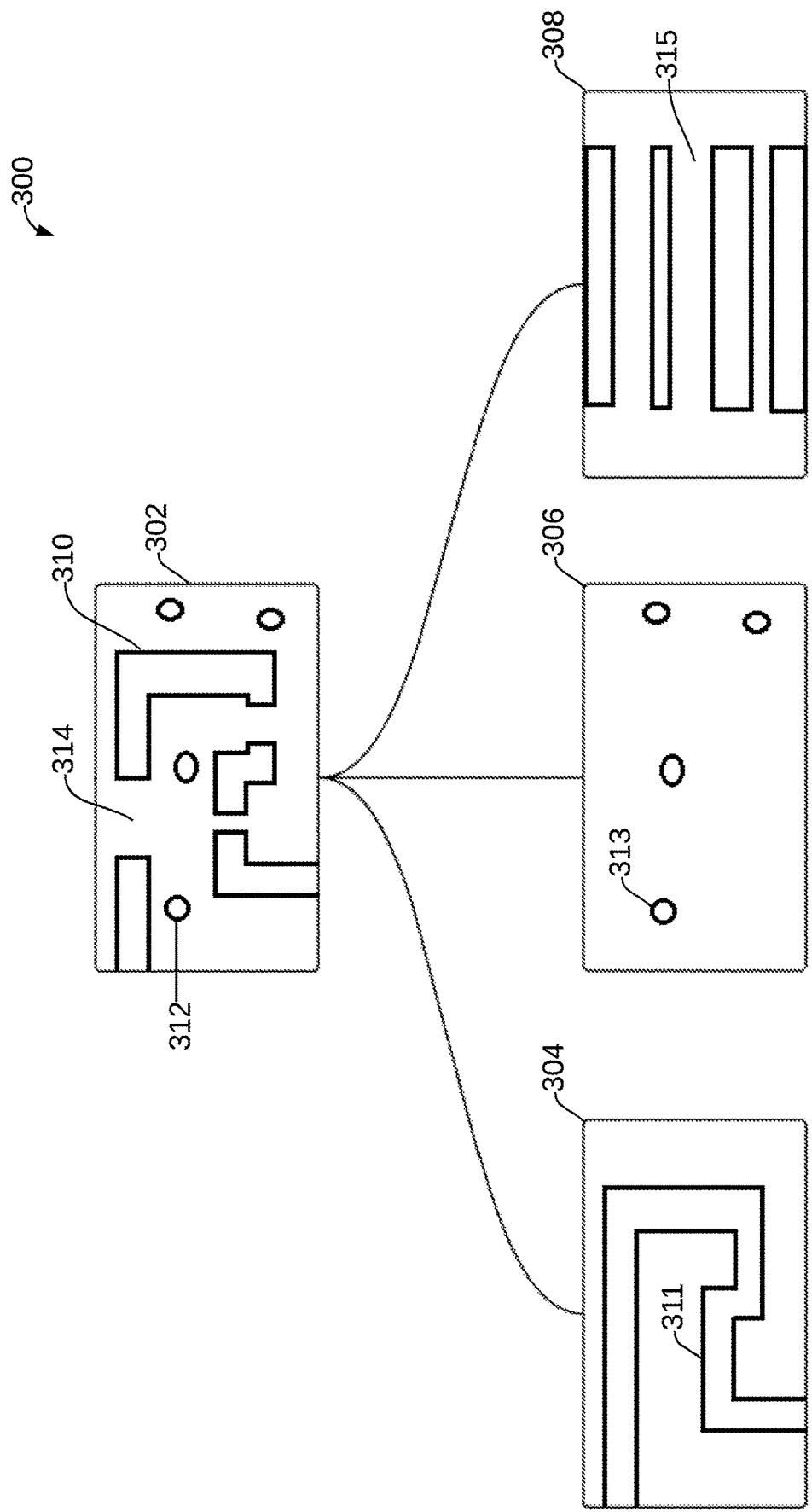
FIG. 3 shows simplified features regarding skills decomposition between complex and basic skills, according to certain embodiments.

FIG. 3 illustrates a graphical representation 300 of skill decomposition to illustrate certain aspects of the disclosure. Illustrated is a computer simulation display 302 whereupon is rendered a notional computer simulation. The computer simulation may be presented to a user via a user computer device, such as local PC client 234 and interacted with via user interface device 212. In practice, multiple users may interact with the computer simulation via a respective user computer device. The interactions may be in real time and may be enabled by a network, such as internet 240.

The notional simulation includes several targets 312 and a platform 310 with non-continuous gaps 314. For example purposes, such a simulation may include a user's avatar (not illustrated) that traverses platform 310 (while jumping over gaps 314) and eliminates targets 312. Presenting a complex computer simulation that requires multiple skills to be used conjunctively presents many challenges when attempting to assess and improve upon a user's level of proficiency at the computer simulation. For example, a user's kill or kill/death ratio may be used as an indicator of proficiency, but it may be difficult to determine why a user is proficient when a certain kill count or kill/death ratio is obtained, much less what skills a user may need improvement on or that they already excel at. For example, the user may be a skilled sniper who performs well on maps that are sniper-friendly and the user may purposely only select such maps to compete upon. In a team setting, the user may not be so proficient on other maps which may not be readily apparent if only observing a kill/death ratio, for example.

Using the disclosed techniques, a user's proficiency at several basic skills can be assessed and improved upon. This allows a user's proficiency at a computer simulation to be better assessed. For example, the techniques can be used to determine what skills are indicative of a proficient user of a computer simulation. Some skills may be determined to be of less importance than others. In certain embodiments, a proportion of skills can be determined that, when aggregated, can be indicative of a proficient user. For example, a highly proficient user (or a certain role for a user) may be determined to be composed of a 30% accuracy skill, 20% jumping skill, and a 50% strafing skill. This information can be used to tailor training plans or assess user proficiency, for example.

Furthermore, the skill proficiency information can be used to determine optimal team compositions. Such information may be difficult or impossible to determine having only a single user's "score" at a simulation (e.g., kill/death ratio). Determining which skills are complementary can be used to estimate and improve upon a level of proficiency of a team instead of an individual user. For example, a suitable role for a certain teammate can be determined and/or a training regime tailored for that individual to better contribute to the proficiency of the team. For example, it may be determined that a specific team is lacking a suitably proficient sniper. Using the disclosed techniques, a certain user may be trained to perform better as a sniper for the user's team which may come at the expense of the user's individual computer simulation performance (e.g., when not on the team).

Illustrated in FIG. 3 is a graphical representation of a decomposition of complex skills as illustrated on computer simulation display 302 into several basic skills illustrated by pathing display 304, shooting display 306, and jumping display 308. Each of displays 304, 306, and 308 can be presented by a display device and interacted with by a user using a user interface device. Each of displays 304, 306, and 308 can be displayed to a user over various time periods via a respective skills assessment test.

Pathing display 304 can, for example, illustrate platform 311 that can correlate to platform 310. As shown, platform 311 can be followed by an avatar (not illustrated) of a user to assess the user's ability to traverse platform 311 in the absence of other skills needed for the overall computer simulation. In other words, skills needed for traversing platform 310 are isolated from gap 314 jumping skills or skills for shooting targets 312. This isolation of platform 311 traversal is an example of a skill assessment test wherein the skill of the user's ability to traverse platform 311 is assessed. A test can be presented, as illustrated by pathing display 304, that may change over multiple iterations of the skill assessment test. For example, platform 311 may be generated with more or more extreme turns or it may scroll across the screen with increasing speed. Thus, a pathing skill assessment test may be made more or less difficult.

The pathing skill assessment test may be made more or less difficult to, for example, implement a training regimen for a user as disclosed herein and/or to tailor the difficulty of the test to match a proficiency of a user. The proficiency may be selected by the user or assessed via his/her relative performance at a computer simulation or baseline skill assessment test(s). If a test's difficulty is too low for a certain user, then metrics collected while the user is performing the test may not be viable for determining the user's level of proficiency. This is because the user may excel at the test and the results may not be statistically significant because there may not be enough variation from metrics that represent an ideal proficiency. This may be amplified, especially if metrics are being used for multiple users that are used, in totality, to determine an individual user's level of proficiency at a skill or computer simulation.

Shooting display 306 and jumping display 308 show corresponding skill assessment tests for shooting and jumping respectively. In shooting display, targets 313 are illustrated as being rendered on shooting display 306. In this test, a user's avatar (not illustrated) may be presented with targets that can shoot (using a crosshair directed by a computer interface device, for example). The targets can be decreased in size, a pathing of a target can be adjusted (speed and/or number of turns), a number of targets present simultaneously can be adjusted, a color of target 313 changed, etc., to modify a level of difficulty presented via shooting display 306 and a corresponding skill assessment test. Targets 313 can correspond to targets 312 and gaps 315 of jumping display 308 can correspond to gaps 314. In jumping display 308, a skill assessment test is illustrated to determine a user's proficiency at jumping over gaps 315. An avatar (not shown) may be directed via a user interface device to jump across gaps 315. Gaps 315 may be changed with respect to length, frequency, and/or difference in heights between ledges, for example, to modify a difficulty of the corresponding jumping skill assessment test. It should be noted that although the various examples are shown in a particular representation (e.g., 2D or 3D environments), myriad representations, scenarios, and settings are possible, as would be appreciated by one of ordinary skill in the art with the benefit of this disclosure.

The following are non-limiting examples of skills that may be used to decompose certain types of computer simulations:

First Person Shooter—an entertainment computer simulation wherein a computer display renders a point of view as if the user were looking through an avatar's eyes. In competitive computer simulations, first person shooters generally require users to shoot at other users' avatars or other targets using a variety of techniques. Certain first-person shooters allow users to simulate control of a person, a robot, a large robotic machine, a tank, etc. It should be understood that many dynamics of a first-person shooter can be modified depending on a current load out of the user (e.g., the user's equipment and/or weapons). For example, different weapons can have different dispersion patterns, and different armor or vehicles can impart different amounts of moment to movement, etc. The following non-limiting skills are contemplated for use with skills assessment tests disclosed herein:

Track—A skill regarding following a target with a crosshair directed by a user interface device.

Peek—The ability of a user to quickly assess and eliminate a target. The target can be presented after a user's avatar moves around a corner, over a ledge, etc.

Spray—The ability of a user to hit one or more targets in quick succession. This skill test can gauge a user's ability to control simulated recoil with a weapon and/or the user's ability to jump between and/or prioritize amongst multiple targets.

Jump—The user's ability to jump between two locations. This can include jumping while running, crouching, firing, etc.

Listen—The user's ability to differentiate within a computer simulation based on sound (e.g., a location, direction, an amount of health of a target, etc.).

Throw/launch Grenade—The user's ability to throw or launch a grenade into a designated area in multiple conditions (lengths, changes of elevation, lighting patterns, etc.).

Racing Simulation—A simulation wherein a user commands a vehicle avatar that can race against competing users' vehicle avatars. The following skills and corresponding tests may be altered to account for differences in avatar vehicle, weather conditions, etc. The following non-limiting skills are contemplated for use with skills assessment tests disclosed herein:

Gear Changing—an assessment of a user's ability to change gears at the correct speed, engine RPM, track conditions, etc.

Low-speed turning—an assessment of a user's ability to traverse relatively sharp turns at various speeds and under varying conditions.

High-speed turning—an assessment of a user's ability to traverse sweeping turns at various speeds and under varying conditions.

Racing Line Tracking—an assessment of a user's ability to maintain course on a predefined racing line, particularly at turns, which can materially affect a user's overall racing performance.

Drafting—An assessment of a user's ability to maintain a certain distance behind a competing vehicle and/or to overtake a vehicle after drafting.

Initial Acceleration—An assessment of a user's ability to accelerate from a stop (e.g., at the beginning of a race).

Braking—An assessment of a user's ability to brake under various conditions (e.g., weather conditions, tire conditions, to a specified speed, etc.).

Real Time Strategy—a simulation wherein users generally build bases and units to compete with other users doing the same. The units can include corresponding weapon systems to destroy enemy units, building, resources, etc. The following non-limiting skills are contemplated for use with skills assessment tests disclosed herein:

Target selection—An assessment of a user's ability to select a specified location/building/unit on a screen.

Building shortcuts—An assessment of a user's ability to build a specified building and/or unit using keyboard shortcuts and/or a combination of keyboard shortcuts and other inputs.

Kiting—An assessment of a user's ability to actively command units to fire at a target and then move after firing, preferably out of range of return fire from the target.

Unit positioning—An assessment of a user's ability to position a group of units to optimal effect (e.g., surround ranged units with melee units, spreading out units susceptible to splash damage, layering flying units on top of ground units, etc.).

Build Order—An assessment of a user's ability to optimally select and time the order at which buildings are built depending on various conditions.

Medical Simulation—A simulation wherein a user diagnoses or treats one or more ailments. This example is included, in part, to explicitly show that the techniques disclosed herein are not limited to entertainment simulation or competitive simulations. The following non-limiting skills are contemplated for use with skills assessment tests disclosed herein:

Incision—An assessment of a user's ability to optimally select an incision location for a specified procedure. The assessment may include analyzing other associated skills like incision drainage.

Setting a bone—An assessment of a user's ability to correctly set a bone after a fracture or after a limb is dislocated.

Suturing—An assessment of a number of methods of suturing different types of wounds that may call for different suture methodologies.

Foreign body removal—An assessment of the success of a user's ability to remove a foreign body of a patient's body, which may include benign and/or malignant growths, while minimizing injury and improving a likelihood of recovery for the patient.

Applying Medication—An assessment of how well a user administers medication (e.g., numbing compound) to a patient (e.g., subcutaneously, intravenously, etc.).

Scan Assessment—An assessment of how accurate a user can read and identify various anomalies on various types of scans (e.g., magnetic resonance imaging (MM), computerized tomography (CAT) scan, XRAY scan, etc.).

CPR—An assessment of a user's ability to perform cardiopulmonary resuscitation (CPR) under various conditions.

Randomization of Iterative Test

Figure 4:
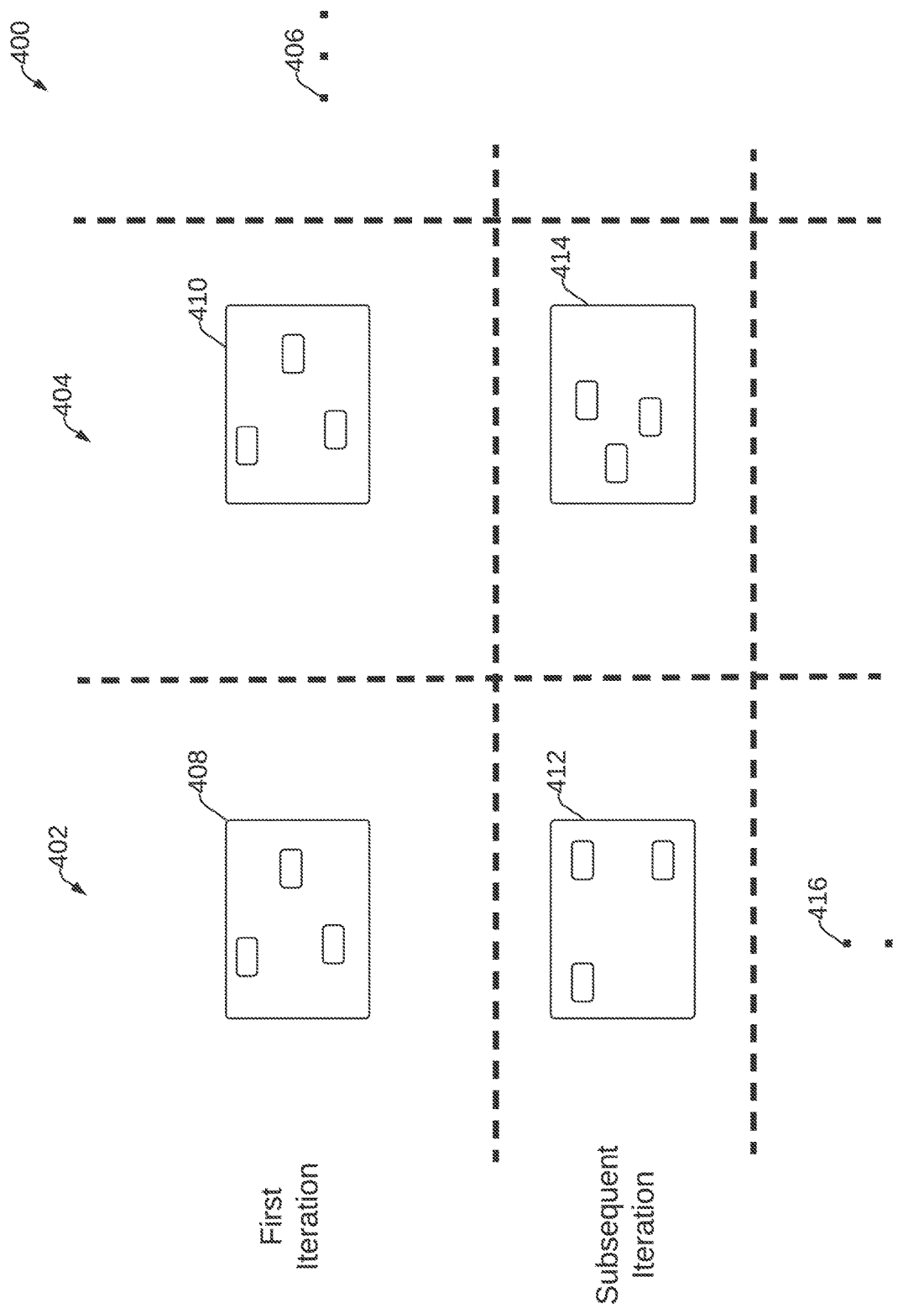
FIG. 4 shows simplified features regarding randomizing iterative skills tests, according to certain embodiments.

FIG. 4 illustrates a notional sequence 400 of skill assessment tests to illustrate features of the disclosure pertaining to a randomization of skills assessment tests. As disclosed herein, still assessment tests (sometimes referred to as "baseline tests") are typically done once (or seldom), they are typically not randomized, are typically the same for all users, and typically measure a starting proficiency. Skill training or challenges (both can be referred to as "challenges") are typically done multiple times, they can be randomized as described herein, and may differ by users, user groups, or the like, and are often used to periodically or continually measure proficiency progression. If the skill test were static (i.e., the same test were administered repeatedly to the user), then the user may be able to memorize the test and therefore optimize his/her results. This could artificially inflate the user's proficiency at the skill and not provide meaningful metrics.

To mitigate the risk of a user memorizing a challenge, aspects of the disclosure pertain to randomizing aspects of subsequent challenges. Illustrated are two sequential collections of challenges, namely a first sequential collection 402 and a second sequential collection 404, each of which can be administered to a corresponding user. More sequential collections of challenges can benefit from aspects illustrated in FIG. 4 as illustrated by ellipsis 406. As illustrated, the first iteration of each sequence (e.g., iteration 408 of first sequential collection 402 and iteration 410 of second sequential collection 404) can be administered substantially identically to multiple users (and possibly across multiple user devices).

The first nearly identical test (baseline test) can be performed by multiple users; raw data can be collected based on the performance of the users. Raw data can include values for the following non-limiting examples which may be collected at multiple times for each iteration:

Time: Time from start of test

Tick: Tick number from start of test

BotID: Id of the current bot

TargetPosX: Target position in X

TargetPosY: Target position in Y

TargetPosZ: Target position in Z

DistanceWithUser: Distance between target and user

IsDucking: True if target was ducking

UserEyeVectorX: The X coordinate of the vector from the user eye to where he/she is aiming UserEyeVectorY: The Y coordinate of the vector from the user eye to where he/she is aiming UserEyeVectorZ: The Z coordinate of the vector from the user eye to where he/she is aiming PerfectEyeVectorX: The X coordinate of the vector from the user eye to where the middle of the head of the target is PerfectEyeVectorY: The Y coordinate of the vector from the user eye to where the middle of the head of the target is PerfectEyeVectorZ: The Z coordinate of the vector from the user eye to where the middle of the head of the target is UserAngle1: Pitch angle of user's reticle UserAngle2: Yaw angle of user's reticle UserAngle3: Roll angle of user's reticle PerfectAngle1: Perfect pitch angle to aim for the center of the head of the target PerfectAngle2: Perfect yaw angle to aim for the center of the head of the target PerfectAngle3: Perfect roll angle to aim for the center of the head of the target InFOV: True if target can be seen by user
OnTarget: True if user is aiming at the target (any part of the body)
BodyPart: Body part on which the user is aiming at
DegreesError: Degrees error between user angle and perfect angle
DistanceError: Interpolate distance error between user angle and perfect angle on the screen (directly linked to degrees error)
TargetHealth: Target current health
BulletShots: Number of bullet shots until now
Damage: Damage done at this tick
HitGroup: Part of the body that was hit
Latency: Current latency The values of the raw data can be digested and used to determine various aspects. For example, the raw data can be analyzed or otherwise used to determine which values of raw data correlate to a successful score at a skill assessment test and/or in what proportion/permutation. In other words, the raw data can be collected across multiple non-randomized challenge iterations collected from a large group of users. The users can be ranked based on a metric, such as a ranking or score on a computer simulation (e.g., kill/death ratio, # of kills, etc.), or a score on a skill test (e.g., a number of targets hit), and/or by comparing values of metrics between users and ranking them.

It should be understood that the baseline test can be segregated based on general skill level such that the baseline test can be different between groups of users but common within a group. For example, a user base can be segregated into beginner, intermediate, and expert skill level groups and the same baseline test iteration administered within the same group. Other methods of user binning or classifications are possible, as would be appreciated by one of ordinary skill in the art with the benefit of this disclosure.

As opposed to the baseline test, a subsequent iteration of the test (e.g., the challenges) can be randomized between users such that a different test is provided to each user, even within a skill group. For example, as illustrated, subsequent test iteration 412 of first sequential collection 402 and subsequent test iteration 414 of second sequential collection 404 are substantially different (e.g., locations of targets being entered and/or a time at which certain targets appear can be altered between tests). The subsequent iterations of tests assessing a same skill can be randomized over time as the test is administered through multiple iterations. The randomization of the tests, as disclosed herein, prevents users from memorizing a test and overly exaggerating a score beyond a user's skill level. It should be understood that many multiple iterations can be administered, each randomized to a degree as represented by ellipsis 416.

The randomization described herein does not necessarily mean that all tests are unique, but the level of randomization focuses on tests administered to a single user being randomized over iterations. Thus, it is possible that a test is identical across users for a certain iteration but is randomized for a single user between iterations of the test. Furthermore, the randomization focuses on aspects of the test that do not alter a level of difficulty of the test. For example, a location and/or pathing of a target from a shooting test may be randomized, but a size or a speed of a target may not be randomized. Otherwise, aspects of the test may be randomized within bounds to maintain the general skill level of a test while still providing statistically significant metrics indicative of a level of proliferation for a test or computer simulation.

Features can be composed from the raw data. Non-limiting examples of features can include:

TotalTime: Time (in seconds) during which the user had a moving target in his/her field of view.
OnTargetTime: Time (in seconds) during which the user was on a target
OnTargetPercentage: Percentage (between 0 and 100) of time the player was aiming at the center of the target.

Features can provide values of metrics that may be directly indicative of a user's proficiency at a skill or a computer simulation. The features can be defined via one or more rules that may be defined and/or generated by a processor. Techniques pertaining to machine learning can be used to digest data including, but not limited to:

1. Determining decomposition rules from raw data to features;
2. Determining rules pertaining to which features and/or raw data values are indicative of a user's proficiency at a skill or a computer simulation;
3. Building models from the data that predict the skill improvements while training the specific skill;
4. Determining rules that correlate a user's performance at a plurality of skills assessment tests to the user's performance at a computer simulation; and
5. Determining rules to optimize the performance of a team including role composition.

Figure 5:
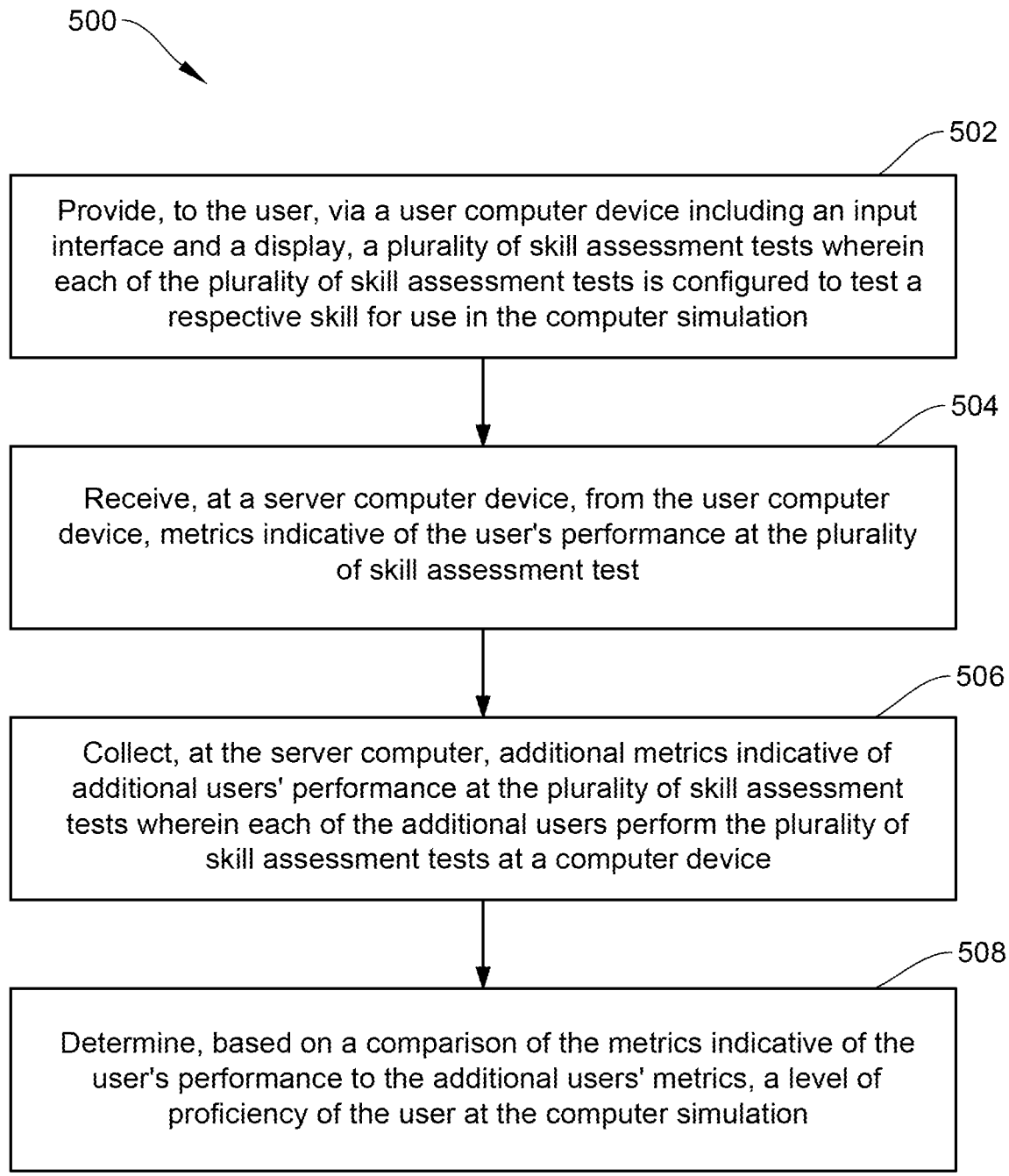
FIG. 5 is a simplified flow chart that illustrates features of the disclosure pertaining to implementing a skills based assessment test to determine a level of proficiency of a user at a computer simulation.

FIG. 5 illustrates a flowchart 500 that illustrates features of the disclosure pertaining to implementing a skills based assessment test to determine a level of proficiency of a user at a computer simulation. At 502, a plurality of skill assessment tests can be generated for a user wherein each of the plurality of skill assessments can test a skill for use in the computer simulation. As disclosed herein, various rules and methodology can be used to score the user at the plurality of skill assessment tests. The skill assessment tests can be administered to the user via a user computer device (e.g., local PC client 234), a display device, and a user interface device.

At 504, metrics can be collected from the user at a server device. The server device can be server 525, for example. The server device can be connected to a plurality of user devices, each administering respective skill assessment test(s). As disclosed herein, the skill assessment test can be provided as a baseline test across the multiple devices for the first iteration and subsequent iterations can be randomized. In certain embodiments, the server may collect metrics from a plurality of users that may share a common user device. For example, two friends may complete the tests on the same user computer device.

The metrics can be used to determine a level of proficiency of a user at each of the skills represented by the skill assessment test(s) and/or for the computer simulation as a whole. The metrics can include values for raw data and/or features in any combination. In certain embodiments, raw data may be collected for a first instance (such as a baseline run of a test) and subsequent metrics can be featured. The values of the raw data can be used to tailor or select rules for determining values of features determined from the raw values. The value of features can be calculated on a user computer device to save bandwidth and storage space at a server device.

At 506, the server device can collect metrics from a plurality of skill assessment tests. The metrics from the plurality of tests are important to determine and process rules associated with determining a level of proficiency of an individual user. The server can process the metrics using machine learning or other techniques to determine a level of proficiency of an individual user at an individual skill or at a computer simulation. The metrics from the plurality of skill assessment tests are useful for providing a large enough set of data to find and characterize statistically significant interdependencies using the disclosed techniques. Furthermore, the server device may be in communication with other computer devices which may provide independent ranking or performance information that may be used to support supervised training of machine learning models, for example.

At 508, an individual user's metrics can be compared, via one or more rules, to the metrics collected from a plurality of tests/users can be used to determine a level of proficiency of the user at the computer simulation as a whole. As disclosed herein, the level of proficiency of the user at the computer simulation can be determined through the use of machine learning constructs that can be trained using data collected from a relatively large data set of metrics from a plurality of users each performing the plurality of skill assessment tests.

The individual metrics can also be used to determine a level of proficiency of the user at a specific role that may be used in the computer simulation. As disclosed herein, the user's relative proficiency at certain ones of the individual skills may indicate that the user is suited (e.g., suitably proficient) at a role for use in the computer simulation. The role can be a member of a team that includes multiple team members, each with a proficiency at a complementary role. The techniques disclosed herein can be used for determining which skills correlate to a level of proficiency of a user at a role, which roles are complementary, etc.

In certain embodiments, a skill assessment for a user can be performed for a user operating a computer simulation (e.g., performing complex skills). For example, raw data values and/or feature values can be recorded while the user is operating a computer simulation as opposed to a computer skill assessment. The values for raw data and/or complex skills can be recorded and used to verify or improve the assessment of the user's proficiency based on the computer assessment skill tests, improve rules for determining a user's proficiency, etc. The disclosed techniques can be used to gather these values for a group of users such that statistically significant information pertaining to the user base for the computer simulation can be obtained and processed using the disclosed techniques.

The disclosed techniques can be used in conjunction with various options within a computer simulation. For example, data and/or features can be option-specific and/or used to determine which options would be suitable for a user. For example, a sensitivity setting for a user interface device can be suggested to improve accuracy, jumping etc. This can be determined by, for example, determining that an individual user's input commands and resulting actions on the screen indicate that a user's sensitivity settings are not aligned with a successful user's settings (which can be similarly determined). Additional options can include recommending certain virtual weapons, armory, inventory, etc. to match the user's skill set. In certain embodiments, these options can be specific to a specific iteration of a computer simulation (e.g., a certain map, game type, etc.).

In further embodiments, results can be merged to individual skills (dual or multi-tasking) to bridge the simplicity of a skill with the complexity of a full game. In further embodiments, models can be enriched with new data sources outside of the present software described herein, including match data, public profile data, wearable sensors, peripheral devices, etc. In some cases, match making based on the various metrics described above can be used for more balanced matches. One of ordinary skill in the art with the benefit of this disclosure would appreciate the many modifications, variations, and alternative embodiments thereof.

In some embodiments, the user computer device and the server computer are a same device. The computer simulation and the plurality of skill assessment tests may use a same engine to generate content of the computer simulation and the plurality of skill assessment tests. The computer simulation may be a network-enabled computer simulation wherein multiple users compete against each other in real time. In some cases, the determining the level of proficiency of the user at the computer simulation includes comparing a ranking of the user at the computer simulation to ranking of other users of the computer simulation, wherein the rankings are determined through metrics other than metrics indicative of users' performance at the plurality of skill assessment tests. In certain embodiments, flowchart 500 can further include: collecting individual results for the user at each of the plurality of skill assessment tests; and determining, based on the results of the user at the each of the plurality of skill assessment tests, a role suited to the user for the computer simulation. Flowchart 500 can also include displaying, to other users of the computer simulation, the role of the user, and displaying, to other users of the computer simulation, a representation of the user's individual results at the each of the plurality of skill assessment tests. In some aspects, flowchart 500 can include displaying, to the user, a representation of the user's level of proficiency at the computer simulation based on the comparison of the metrics indicative of the user's performance to the additional users' metrics.

Figure 6:
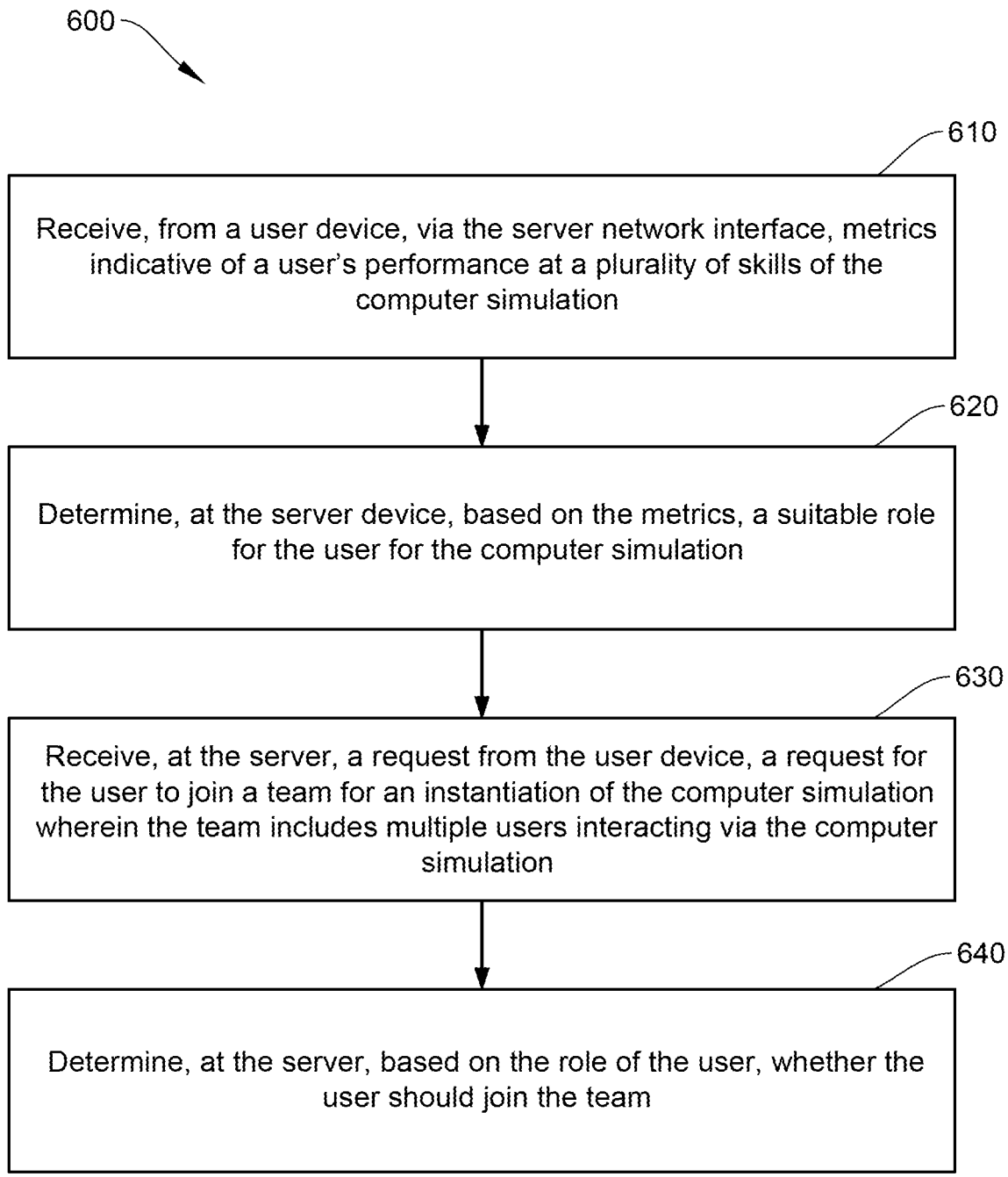
FIG. 6 is a simplified flow chart showing aspects of a method for matching users of a computer simulation by role, according to certain embodiments.

FIG. 6 is a simplified flow chart 600 showing aspects of a method for matching users of a computer simulation by role, according to certain embodiments. Flow chart 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, flowchart 600 can be performed by aspects of FIG. 1, 2, or a combination thereof.

At operation 610, flow chart 600 can include, at a server device including a server network interface, receiving, from a user device, via the server network interface, metrics indicative of a user's performance at a plurality of skills of the computer simulation, according to certain embodiments.

At operation 620, flow chart 600 can include determining, at the server device, based on the metrics, a suitable role for the user for the computer simulation, according to certain embodiments.

At operation 630, flow chart 600 can include receiving, at the server, a request from the user device, a request for the user to join a team for an instantiation of the computer simulation wherein the team includes multiple users interacting via the computer simulation, according to certain embodiments.

At operation 640, flow chart 600 can include determining, at the server, based on the role of the user, whether the user should join the team, according to certain embodiments.

In some embodiments, the suitable role can be determined based on a comparison of the metrics with corresponding metrics of other users indicative of the other users' performance at the plurality of skills of the computer simulation. The metrics can be determined through a plurality of skill assessment tests performed on a user device or through an analysis of the user operating the computer simulation. In some cases, the role can be determined based on a determination, via analysis of the metrics, that the user is proficient at a certain subset of the plurality of skills. In certain embodiments, the determining whether the user should join the team is further based on a determination that the user has a relative level of proficiency at the role corresponding to other members of the team's proficiency at their respective roles. The relative levels of proficiency of the user at the role may be determined by comparing, via the metrics, the user's proficiency at a subset of the plurality of skills versus other users' proficiency at the subset of the plurality of skills. In some case, the determination that the user has the relative level of proficiency at the role corresponding to the other members of the team's proficiency at their respective roles can include determining that each member of the team has a corresponding rank in their respective role wherein the rank is determined by comparing the each team member's proficiency at the plurality of skills to other users of the computer simulation's proficiency at the plurality of skills.

It should be appreciated that the specific steps illustrated in the flow chart 600 of FIG. 6 provide a particular method for matching users of a computer simulation by role, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 7:
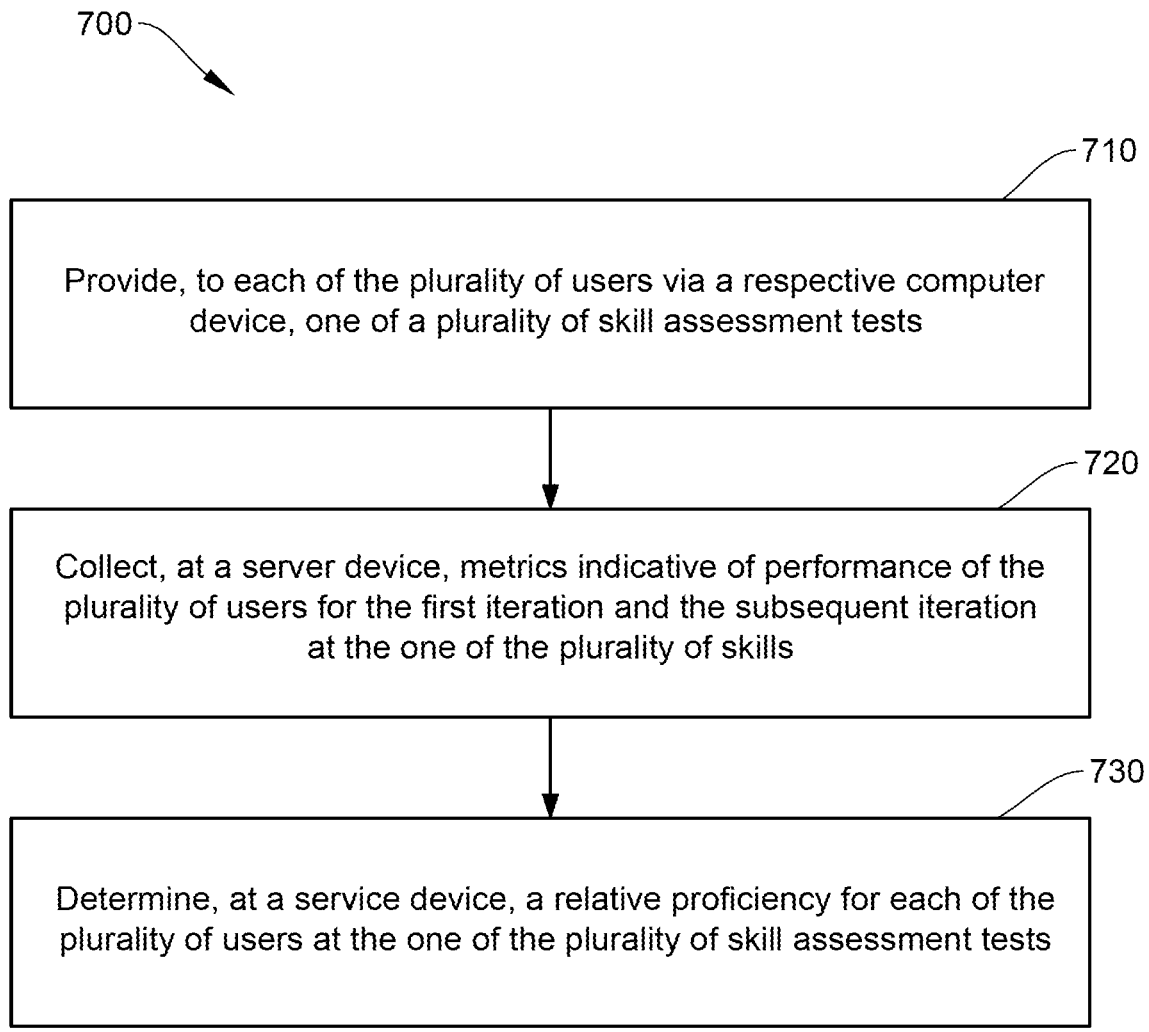
FIG. 7 is a simplified flow chart showing aspects of a method for determining a proficiency of a plurality of users at a computer simulation, according to certain embodiments.

FIG. 7 is a simplified flow chart 700 showing aspects of a method for determining a proficiency of a plurality of users at a computer simulation, according to certain embodiments. Flow chart 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, flowchart 700 can be performed by aspects of FIG. 1, 2, or a combination thereof.

At operation 710, flow chart 700 can include providing, to each of the plurality of users via a respective computer device, one of a plurality of skill assessment tests, wherein: each of the plurality of skill assessment tests is configured to test a respective skill for use in the computer simulation; a first iteration of the one of the plurality of skill assessment tests is common for each of the plurality of users; and a subsequent iteration of the one of the plurality of skill assessment tests is randomized such that the subsequent iteration of the one of the plurality of skill assessment tests is different for each of the plurality of users but still tests the proficiency of the plurality of users at a skill corresponding to the one of the plurality of skill assessment tests, according to certain embodiments.

At operation 720, flow chart 700 can include collecting, at a server device, metrics indicative of performance of the plurality of users for the first iteration and the subsequent iteration at the one of the plurality of skills, according to certain embodiments.

At operation 730, flow chart 700 can include determining, at a service device, a relative proficiency for each of the plurality of users at the one of the plurality of skill assessment tests, according to certain embodiments.

In some embodiments, the plurality of skill assessment tests may be administered to the user via a user device including an input device and a display device. In some cases, the randomized subsequent iteration of the one of the plurality of skill assessment tests includes a rendered object that is randomized with respect to at least one of a location or a time that the rendered object appears on the display device. In some cases, an amount of randomization applied to the rendered object is selected based on a current level of proficiency of the user at the one of the plurality of skills. The metrics can include data generated corresponding to a status of the input device as the user operates the input device in response to the randomized rendered object. In certain embodiments, the metrics are organized into features, wherein each of the features includes a quantitative value corresponding to one or more of the metrics and quantitative values for the features are used to determine a level of proficiency of the plurality of users at the one of the plurality of skill assessment tests instead of all of the metrics. In some embodiments, each of the plurality of skill assessment tests is administered to the plurality of users as a corresponding first common baseline test and a corresponding subsequent randomized test. In some cases, each of the plurality of skill assessment tests is configured to assess a user's proficiency at a task that is performed as part of the computer simulation.

It should be appreciated that the specific steps illustrated in flow chart 700 of FIG. 7 provide a particular method for determining a proficiency of a plurality of users at a computer simulation, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

As used in this specification, any formulation used of the style "at least one of A, B or C," and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word "comprising" does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, examples or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment," "according to an embodiment" and the like, which are merely a stylistic form of wording and are not to be construed as limiting the following features to a separate embodiment to all other instances of the same or similar wording. This is to say, a reference to "an", "one" or "some" embodiment(s) may be a reference to any one or more, and/or all embodiments, or combination(s) thereof, disclosed. Also, similarly, the reference to "the" embodiment may not be limited to the immediately preceding embodiment.

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks. Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement machine instructions. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of function.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

What is claimed is:

1. A system for matching users of a computer simulation by role, the system comprising:
    a user computer device including:
        a user device display;
        an input device;
        one or more user computer device processors configured using machine readable instructions stored on a user device memory, the machine readable instructions including instructions to:
            render a notional computer simulation on the user device display;
            provide a plurality of skill assessment tests in the notional computer simulation, which is a visual, immersive computer-simulated environment provided to a user, wherein each skill assessment test measures the ability of the user to perform an action in the notional computer simulation with an input device;
    a server device including:
        a server network interface; and
        one or more server processors coupled to the server network interface, the one or more server processors configured using machine readable instructions stored on a memory, the machine readable instructions including instructions to:
            receive, via the server network interface, from a first user device, metrics that are indicative of a first user's performance at a plurality of skill assessment tests of a computer simulation which is a visual, immersive computer-simulated environment provided to a user, wherein the respective skill is the ability to perform an action with an input device for the computer simulation;
            determine, based on the metrics and a first user's relative proficiency at each of the plurality of skill assessment tests using the input device, a suitable role for the first user for the computer simulation, wherein the role is determined by user proficiency in a subset of the skill assessment tests;
            receive, via the server network interface, a request from the first user device, a request for the first user to join a team for an instantiation of the computer simulation wherein the team includes multiple users interacting via the computer simulation;
            receive, via the server network interface, from a second user device, metrics that are indicative of a second user's performance at a plurality of skill assessment tests of the computer simulation;
            determine, based on the metrics and a second user's relative proficiency at each of the plurality of skill assessment tests using a second input device, a suitable role for the second user for the computer simulation;
            receive, via the server network interface, a request from the second user device for the second user to join a team for an instantiation of the computer simulation wherein the team includes multiple users interacting via the computer simulation; and
            determine, based on the roles of the first and second users, whether the first and second users join the team.

2. The system of claim 1, further comprising determining whether the user should join the team is based on one or more rules that define an optimal composition of roles for the team and a comparison of whether the role of the user aligns with other users' roles for the team based on the one or more rules.

3. The system of claim 1, further comprising determining whether the user should join the team is based on a preference set by the user defining a role composition for the team.

4. The system of claim 1, further comprising determining whether the user should join the team is based on a comparison of a ranking of the user at the computer simulation to corresponding rankings of other potential members of the team.

5. A system for matching users of a computer simulation by role, the system comprising:
  a user computer device including:
    a user device display;
    an input device;
    one or more user computer device processors configured using machine readable instructions stored on a user device memory, the machine readable instructions including instructions to:
    render a notional computer simulation on the user device display; [0074]
    provide a plurality of skill assessment tests in the notional computer simulation, which is a visual, immersive computer-simulated environment provided to a user, wherein each skill assessment test measures the ability of the user to perform an action in the notional computer simulation with an input device;
  a server device including:
    a server network interface; and
    one or more server processors coupled to the server network interface, the one or more server processors configured using machine readable instructions stored on a memory, the machine readable instructions including instructions to:
    receive, from a first user device, via the server network interface, metrics indicative of a user's performance at a plurality of skills of the computer simulation which is a visual, immersive computer-simulated environment provided to a user, wherein the respective skill is the ability to perform an action with a first input device for the computer simulation;
    determine, based on the metrics and a first user's relative proficiency at each of the plurality of skill assessment tests using the input device, a suitable role for the first user for the computer simulation, wherein the role is determined by user proficiency in a subset of the skill assessment tests;
    receive, from the first user device, a request for the first user to join a team for an instantiation of the computer simulation wherein the team includes multiple users interacting via the computer simulation;
    receive, from a second user device, via the server network interface, metrics indicative of a second user's performance at a plurality of skills of the computer simulation;
    determine, based on the metrics and a second user's relative proficiency at each of the plurality of skill assessment tests using a second input device, a suitable role for the first user for the computer simulation;
    receive, from the second user device, a request for the second user to join a team for an instantiation of the computer simulation wherein the team includes multiple users interacting via the computer simulation;
    determine, based on the roles of the first and second users, whether the first and second users should join the team;
    wherein the suitable role is determined based on a comparison of the metrics with corresponding metrics of other users indicative of the other users' performance at the plurality of skills of the computer simulation; and
    wherein the metrics are determined through a plurality of skill assessment tests performed on a user device.

6. The system for matching users of a computer simulation by role of claim 5, wherein the input device is one of a mouse, trackball, joystick, keyboard, gamepad, steering wheel, paddle, yoke, directional pad, throttle quadrant, pedal, light gun, button, stylus, touchpad, touch screen or 3D motion controller.

7. The system for matching users of a computer simulation by role of claim 5, wherein the metrics include a measurement of the ability to perform an action with the input device within a given amount of time or energy.

8. The system for matching users of a computer simulation by role of claim 5, wherein a plurality of the skill assessment tests are tests of basic skills that are decompositions of a complex skill.

9. The system for matching users of a computer simulation by role of claim 5, wherein the role is determined based on a determination, via analysis of the metrics, that the user is proficient at a certain subset of the plurality of skills.

10. The system for matching users of a computer simulation by role of claim 5, wherein the determining whether the user should join the team is further based on a determination that the user has a relative level of proficiency at the role corresponding to other members of the team's proficiency at their respective roles.

11. The system for matching users of a computer simulation by role of claim 10, wherein the relative levels of proficiency of the user at the role are determined by comparing, via the metrics, the user's proficiency at a subset of the plurality of skills versus other users' proficiency at the subset of the plurality of skills.

12. The system for matching users of a computer simulation by role of claim 11, wherein the determination that the user has the relative level of proficiency at the role corresponding to the other members of the team's proficiency at their respective roles includes:
  determining that each member of the team has a corresponding rank in their respective role wherein the rank is determined by comparing the each team member's proficiency at the plurality of skills to other users of the computer simulation's proficiency at the plurality of skills.

13. A method for matching users of a computer simulation by role, the method comprising, using machine readable instructions stored on a memory and executed by one or more processors:
  at a user computer device, rendering a notional computer simulation on a user device display;
  providing a plurality of skill assessment tests in the notional computer simulation, which is a visual, immersive computer-simulated environment provided to a user, wherein each skill assessment test measures the ability of the user to perform an action in the notional computer simulation with an input device;

at a server device including a server network interface, receiving, from a user device, via the server network interface, metrics indicative of a user's performance at a plurality of skills of the computer simulation, which is a visual, immersive computer-simulated environment provided to a user, wherein the respective skill is the ability to perform an action with an input device for the computer simulation;

determining, at the server device, based on the metrics and a first user's relative proficiency at each of the plurality of skill assessment tests using the input device, a suitable role for the first user for the computer simulation;

receiving, at the server device, a request from the user device, a request for the first user to join a team for an instantiation of the computer simulation wherein the team includes multiple users interacting via the computer simulation;

receive, at the server device, from a second user device, metrics that are indicative of a second user's performance at a plurality of skill assessment tests of the computer simulation;

determine, based on the metrics and a second user's relative proficiency at each of the plurality of skill assessment tests using a second input device, a suitable role for the second user for the computer simulation, wherein the role is determined by user proficiency in a subset of the skill assessment tests;

receive, at the server device, a request from the second user device for the second user to join a team for an instantiation of the computer simulation wherein the team includes multiple users interacting via the computer simulation; and determining, at the server, based on the role of the first and second users, whether the first and second users should join the team.

14. The method for matching users of a computer simulation by role of claim 13, wherein the suitable role is determined based on a comparison of the metrics with corresponding metrics of other users indicative of the other users' performance at the plurality of skills of the computer simulation.

15. The method for matching users of a computer simulation by role of claim 13, wherein the metrics are determined through a plurality of skill assessment tests performed on a user device.

16. The method for matching users of a computer simulation by role of claim 13, wherein the metrics are determined through an analysis of the user operating the computer simulation.

17. The method for matching users of a computer simulation by role of claim 16, wherein the role is determined based on a determination, via analysis of the metrics, that the user is proficient at a certain subset of the plurality of skills.

18. The method for matching users of a computer simulation by role of claim 17, wherein the determining whether the user should join the team is further based on a determination that the user has a relative level of proficiency at the role corresponding to other members of the team's proficiency at their respective roles.

19. The method for matching users of a computer simulation by role of claim 18, wherein the relative levels of proficiency of the user at the role is determined by comparing, via the metrics, the user's proficiency at a subset of the plurality of skills versus other users' proficiency at the subset of the plurality of skills.

20. The method for matching users of a computer simulation by role of claim 18, wherein the determination that the user has the relative level of proficiency at the role corresponding to the other members of the team's proficiency at their respective roles includes:

determining that each member of the team has a corresponding rank in their respective role wherein the rank is determined by comparing the each team member's proficiency at the plurality of skills to other users of the computer simulation's proficiency at the plurality of skills.

* * * * *